United States Patent Office 2,763,599
Patented Sept. 18, 1956

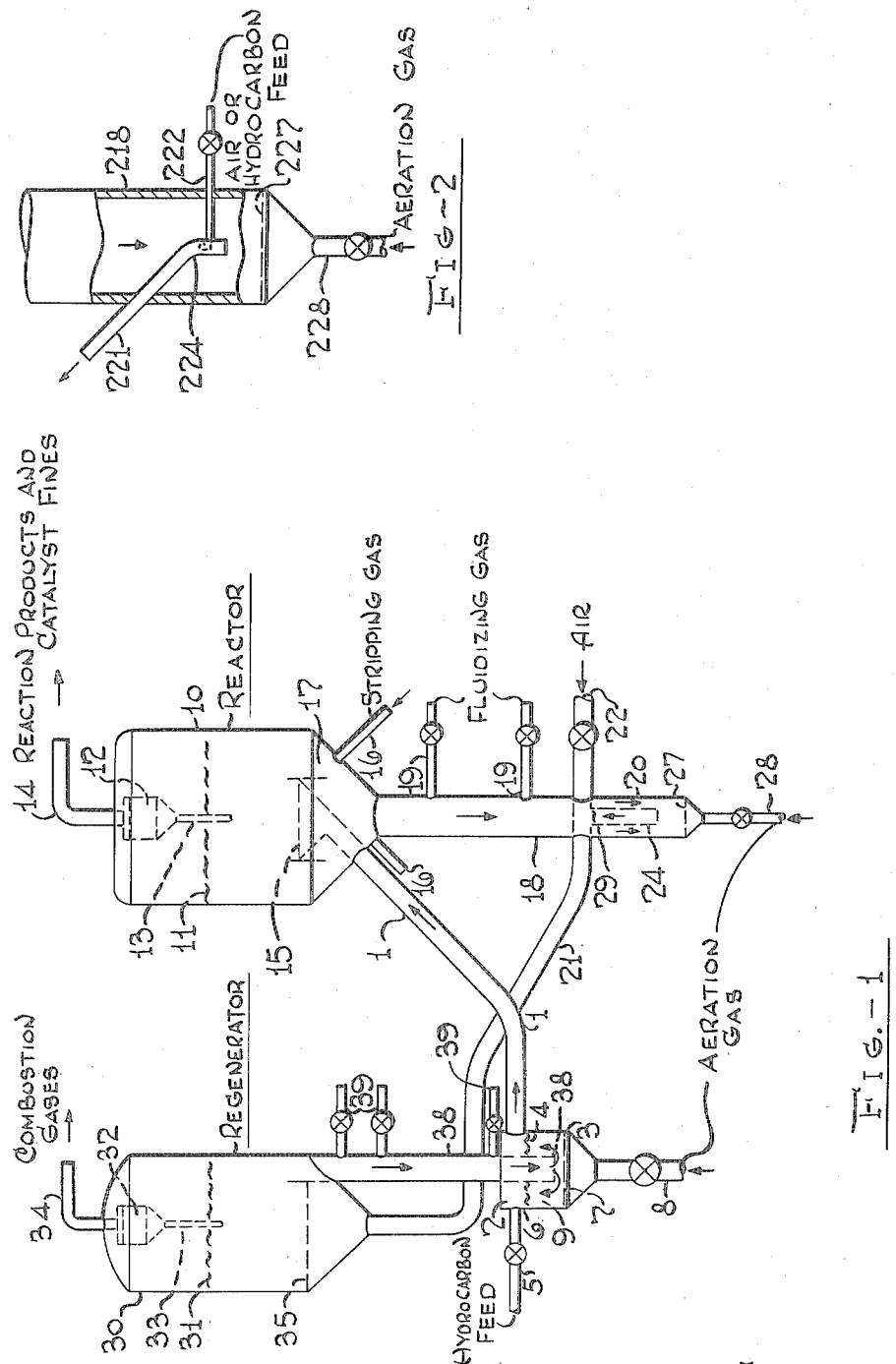

2,763,599

APPARATUS AND TECHNIQUE FOR CONTROLLING FLOW OF FINELY DIVIDED SOLIDS IN THE CONVERSION OF HYDROCARBONS

Alan C. Abeel, Jr., Larchmont, N. Y., and George L. Matheson, Summit, N. J., assignors to Esso Research and Engineering Company, a corporation of Delaware Application April 18, 1951, Serial No. 221,694

5 Claims. (Cl. 196—52)

This invention relates to a device and process useful in operations employing finely divided solid contacting materials. More specifically the invention relates to an improved means for introducing finely divided catalyst into a transfer line without the use of slide valves, particularly in systems wherein hydrocarbon vapors are converted in the presence of a fluidized, liquid-simulating catalyst. Still more particularly the invention is applicable to catalytic cracking systems wherein regenerated and/or fresh catalyst is continuously being fed from a standpipe through a transfer line into a reaction zone wherefrom spent catalyst is continuously being withdrawn by way of another standpipe and transfer line into a combustion zone for regeneration and recycling to the reaction zone.

An object of the present invention is a means for controlling the flow of catalyst in a conversion system without the use of slide valves, which in prior art systems had a tendency to become eroded too rapidly. Another object is to effect control over catalyst flow from one part of the system to another by a flow control means having no movable members exposed to the abrasive action of finely divided solids. A further object is to achieve control over catalyst flow by a proper variation of the amount of aeration, thereby directly adjusting the intrinsic rheological properties of the catalyst stream without constricting or altering the path through which the catalyst passes. Another object is to improve the evenness of catalyst flow and to avoid accidental emptying of standpipes. Still other objects and advantages of the invention will become apparent from the subsequent description wherein reference will be made to the accompanying drawing which illustrates various modifications of the novel flow control devices and their use in a two-stage conversion system.

Fig. 1 is a diagrammatic illustration of a catalytic cracking system employing the flow control means of the present invention; and Fig. 2 shows an enlarged view of a nalternative modification of the novel flow control well adapted to be operated in accordance with the present invention.

For catalytic cracking of hydrocarbons, with reference to which the present invention will be described by way of example, it is preferred to use catalysts of the silica-alumina type such as acid treated montmorillonite, or synthetic catalysts consisting essentially of activated silica with alumina, with or without additional ingredients such as oxides of zirconium, beryllium, thorium or of other metals, or of aluminum fluosilicate or other components known to the art. However, the invention is equally applicable to other types of reactions such as hydrogenation or hydrocarbon synthesis, in which case other appropriate catalysts will, of course, be used in accordance with conventional practice, or the invention may similarly be applied to processes using sand or even finely divided metal particles, it being understood that the present invention is not limited to any particular chemical reaction or to solid particles of any particular composition, but is essentially of a physical nature and relates primarily to a new technique of and a new device for handling finely subdivided solids.

Typical catalysts or other solid particles to which the present invention is applicable must have a particle size ranging between 20 to 200 or 500 microns, and a bulk density of about 30 to 60 or 100 pounds per cubic feet or even higher. More particularly the powdered solids suitable for handling in accordance with this invention must be substantially free of very fine particles, i. e., they must contain preferably not more than about 1 or 2% of particles having a diameter below 20 microns, and the average particle size of the powdered solids should be at least 50 microns. This limitation on fines content is most important, since particle mixtures containing an appreciable proportion of fines, once aerated, tend to hold a substantial amount of the aeration gas even after injection of the gas is discontinued, and the retained gas makes the powdered solids free flowing for a sufficient period of time to carry the catalyst by the well.

In contrast, it is essential for the purposes of the present invention that the degree of aeration of the powdered solids whose flow rate is to be regulated respond rapidly to changes in the velocity of the aeration gas, inasmuch as the regulation of flow according to this invention is based primarily on the effect exerted by variations in aeration gas velocity on the flow resistance of the aerated solids. Also, the flow of powdered solids having an average particle size below about 50 microns is rather difficult to regulate since only a very small aeration gas velocity is required for complete fluidization of such fine solids, whereas the present invention operates most effectively in regions where the velocity of aeration gas not only can be held close to the minimum required for complete aeration of the solids, but also it must be practical to make sensitive variations in that velocity in a range which extends from 0 to about 120% of the minimum fludization velocity, as will be later explained in greater detail.

With slight aeration corresponding to superficial gas velocities of about 0.01 to 0.5 foot per second, the density of the fluidized solids used in the invention is about 0 to 20% less than the bulk density, while with gas velocities of about 1 to 2 or 3 feet per second the aerated density of the catalyst may drop considerably more due to the presence of bubbles. It is at these latter gas velocities that the powdered catalyst is maintained in a dense, turbulent, liquid-simulating phase which has been found most satisfactory for effecting various vapor-phase reactions by the now well known "fluid catalyst" technique, whose principles and typical equipment are described and illustrated, for example, in U. S. Patent 2,490,798 of Gohr et al.

Essentially the present invention is applicable to any system wherein it is necessary or desirable to feed substantially de-aerated solid particles, for instance, from the bottom of a more or less vertical standpipe to a horizontal or inclined transfer line wherein the solids are to be mixed with a gas or vapor. The standpipe may serve, for instance, as a means for withdrawing powdered catalyst from a storage hopper, from a hydrocarbon conversion zone or from a catalyst regeneration or combustion zone. And the transfer line may serve as a means for carrying a mixture of active catalyst and fresh feed vapors to a catalytic cracking zone, or spent catalyst and an oxygen-containing gas or steam to a regeneration zone, or for carrying any mixture of any inert or reactive gas and finely divided solids of proper particle size and density to a desired zone.

Referring to Figure 1 of the drawing, hydrocarbon feed is introduced into the system through a line or pipe 5 which terminates in one or more spray nozzles 6 and mixed with hot catalyst which passes from regenerator standpipe 38 into line 1 through well 3 which will be later described in detail. In the catalytic cracking of hydrocarbons or other conversion reactions, the liquid feed such as crude petroleum or gas oil may be preheated by passing through a heat exchanger (not shown) or it may be partially vaporized in a vaporizing furnace (not shown), but usually insufficient heat is supplied to vaporize the oil feed completely or to supply the heat of reaction. Heat for vaporizing the oil and converting it is supplied by the hot regenerated catalyst particles with which the oil becomes mixed in hot mixing zone 2 and the resulting oil vapors then carry the catalyst in dilute suspension through line 1 into reactor 10. In general the gas rate in transfer line 1 is between about 20 and 100 ft./sec. and the ratio of catalyst to hydrocarbon in line 1 is between about 3/1 and 20/1.

The mixture of catalyst and vapor feed passes from line 1 through distributor plate 15 to a large-diameter reactor 10 wherein the vapor velocity is greatly reduced and the mixture is maintained in the form of a dry, dense, fluidized bed having a level indicated at 11, above which exists a dilute, disperse phase as is well known. The reaction products in vapor form leave the fluidized catalyst bed upwardly through a separating means such as a cyclone 12 which returns entrained solid particles through dip pipe 13 to the dense bed below level 11. Vaporous reaction products pass through line 14 to a fractionation system (not shown).

Spent catalyst is passed downwardly from the reaction zone through stripping zone 17 into which a stripping gas is introduced through lines 16. Purged spent catalyst is withdrawn from the bottom of chamber 10 by means of a standpipe 18 wherefrom it passes to regenerator 30 through well 20, the details of which will also be described later. From well 20 the catalyst is carried by air introduced at 22 through transfer line 21 and distributor plate 35 into regenerator vessel 30 where the catalyst is again maintained in a known manner as a dense fluid phase having an upper level 31. In the regenerator the carbonaceous deposit is burned off the catalyst particles, the combustion gases passing upwardly through cyclone 32 and withdrawal line 34, while regenerated catalyst passes downwardly into standpipe 38 for return to reactor vessel 10 after mixing with further feed in transfer line 1.

The essence of the invention resides in introducing catalyst particles from standpipes 38 and 18 into transfer lines 1 and 21, respectively, without requiring any slide valves for controlling the catalyst rate. This is made possible by replacement of the valves by special transfer wells 3 and 20 at the lower end of standpipes 38 and 18. For the sake of convenience, wells 3 and 20 are shown in Fig. I in the form of two different, alternative constructions, though normally in a given system it will be found preferable to have all transfer wells of the same design.

In operation of the system hot regenerated catalyst is continuously being withdrawn from regenerator vessel 30 downwardly through standpipe 38 into which small amounts of a fluidizing gas such as air or steam at proper pressure may be introduced at one or more points through lines 39 so as to facilitate smooth flow of the particles by maintaining them in the standpipe in aerated condition. In previously known designs the standpipe entered transfer line 1 directly from above so that the catalyst dropped from the standpipe through a valve more or less intermittently into the transfer line in the form of relatively large portions or slugs, thereby causing unevenness of flow. Also, with the connection on the topside of the transfer line, a relatively slight cessation of catalyst flow allowed gas from the transfer line to rise up the standpipe, thereby causing an accidental emptying of the latter.

In contrast, the present invention assures even flow of catalyst by extending the standpipe 38 downwardly through and below the level of the transverse transfer line 1 and by providing a cylindrical, preferably concentric well or reservoir 3 which surrounds the bottom portion of the standpipe and communicates with the transfer line, and has a high-resistance aeration grid 7 as its bottom. It is important for the purposes of the present invention that the aeration grid 7 provide even and uniform gas distribution over the entire cross-section of well 3. Accordingly, the grid may suitably be a porous porcelain plate representing a pressure drop of about 0.1 to 0.5 or 1 lb./sq. in. at a gas rate of about 1 ft./sec., or a metal disc representing a like pressure drop and having a large number of fine orifies drilled evenly therethrough.

A fluidizing gas such as steam, air or a hydrocarbon gas is introduced through valved line 8 below grid 7 at a controlled velocity so as to induce well distributed but moderate aeration of the catalyst in the well as will be discussed later. Due to the hydrostatic pressure built up in the standpipe, the catalyst discharged from the standpipe and fluidized in well 3 then rises in the annular space 9 of well 3 and forms a dense bed therein having an upper level 4 approximately where the well opens into transfer line 1. Accordingly, as feed introduced through nozzle 6 vaporizes and passes over the catalyst level in well 3, a controllable amount of catalyst is carried with the gas into reactor vessel 10, the amount of catalyst carried into the reactor being governed both by the amount of fluidizing gas in well 3 and by the gas and/or vapor rate in line 1.

An alternate and even more advantageous flow control device 20 is illustrated in the drawing in connection with reactor standpipe 18. Operation of standpipes in fluid systems has shown that the maximum linear velocity of solids flowing down a standpipe is limited to about 0.3 to 0.5 foot per second, the exact value depending somewhat upon the characteristics of the solids being fed. Above this velocity the standpipe does not contain a homogenous dense bed of solids, but the flow becomes slug-type, with alternate dense and disperse sections. This condition is undesirable since it precludes a smooth, steady catalyst flow to the reactor and the resulting unsteady condition of the system is further aggravated by the sudden variations in standpipe static head which accompany slug type flow. Consequently standpipe diameter is one of the factors which limit the rate of catalyst transfer in conventional fluid systems.

Furthermore, a smooth transfer of solids out of a standpipe requires that the path of solids through any horizontal portion of pipe be as unobstructed as possible. Also, the volume of such horizontal portions should be minimized so as to prevent the build-up of solids in the line which would tend to dump at irregular intervals. In the preferred modification, smooth transfer and high catalyst rates have been made obtainable by placing a vertical return line 24 within the well-forming portion 20 of standpipe 18, thus permitting the use of standpipes of very large cross-sectional area. At the same time, the presence of the well at the foot of the standpipe prevents accidental emptying of the standpipe, which has heretofore been a serious risk with standpipes of large diameter, especially since the conventional slide valves tended both to wear excessively and to jam in the open position.

In operating the system containing the modified well device 20, spent catalyst being withdrawn from reaction zone 10 passes downwardly through standpipe 18 into which an aeration gas, as previously described, may be introduced through lines 19 in order to maintain the contents of the standpipe in flowable condition. Here again a transfer line 21 passes transversely across the lower portion of standpipe 18 while a high resistance aeration grid 27 similar to grid 7 previously described and a valved gas inlet 28 below grid 27 is provided for at the bottom of the standpipe for moderately aerating the catalyst and for allowing such aerated catalyst, by the effect of the hydrostatic head in standpipe 18, to be pushed back up through the return line 24 into transfer line 21 wherein the catalyst is picked up by the air or gas introduced at 22 and is thus transported to vessel 30 for regeneration.

Here again the rate of catalyst transfer is subject to control by several more or less independent factors.

From the standpoint of the present invention, the most important variable by which catalyst flow is controlled without use of mechanical valves is by the degree of aeration in well 20 which governs the viscosity or mobility of the catalyst in the well. Secondly, catalyst transfer rate can be varied somewhat by the degree of catalyst aeration in standpipe 18 which governs the hydrostatic pressure, as well as the rate of downward catalyst flow, as below a certain minimum of aeration the downward flow of solids ceases completely. Thirdly, the catalyst flow can also be affected by the air rate in line 22 which largely governs the amount of catalyst entrained from the well through line 21.

The construction of the catalyst transfer wells illustrated in Fig. 1 may be further modified as shown in Fig. 2, the embodiment represented in Fig. 2 being especially adapted for handling catalyst of relatively coarse particle size and accordingly requiring relatively high gas velocities in the transfer line. Referring specifically to Fig. 2, numeral 218 refers to the lower portion of a standpipe which is analogous to reactor standpipe 18 shown in Fig. 1. In this embodiment spent and stripped catalyst is withdrawn downwardly through standpipe 218 from the dense phase of the reactor such as reactor 10 of Fig. 1 and passes up through line 221 to a regenerator such as regenerator 30 of Fig. 1 for regeneration and recirculation to the reactor. A high-resistance aeration grid 227 and a valved aeration gas inlet 228 are provided at the foot of the standpipe 218 in a manner analogous to grid 27 and inlet 28 shown in Fig. 1.

The major difference between well 20 shown in Fig. 1 and the well illustrated in Fig. 2 is that transfer line 221 does not traverse the standpipe. Instead, the transfer line is bent downward within standpipe 218, preferably so that the open terminal portion 224 of the transfer line is located concentrically within the bottom portion of standpipe 218 a short distance above grid 227, and a separate smaller air pipe 222 is arranged so as to terminate within the terminal portion 224 of transfer line 221, the end portion of the air pipe 222 preferably being directed upward in the intended direction of flow. Rate of catalyst transfer is again controlled primarily by proper adjustment of the degree of aeration in the bottom portion of reactor standpipe 218. However, while the device in Fig. 2 has been described specifically as being used in conjunction with a reactor standpipe, it will be apparent that it can be used similarly, for instance, in conjunction with a regenerator standpipe, in which event hydrocarbon feed will be injected through line 222 and the resulting dilute suspension of catalyst in feed vapors will pass through line 21 to a fluid reactor.

As stated earlier herein, the present invention is based primarily on the discovery that, in a properly designed structure as illustrated in the drawing, sensitive control over the flow of finely divided solids can be achieved in a fluid system by directly varying the aeration and consequently the viscosity or flow resistance of the stream of solids. However, to carry out the desired control effectively, it is essential that certain critical conditions be observed, both with respect to particle size of the solids transferred and with respect to gas velocity within the control device.

More specifically, it is essential that the solids be essentially free of fine particles having a diameter of 20 microns or less as was pointed out earlier herein. Secondly, it is important that the superficial gas velocity in the control device, e. g., in the annular space 9 in Fig. 1 of the drawing be maintained uniform and close to the minimum fluidization velocity of the solids, by which velocity is meant that upward superficial gas velocity at which the entire weight of solid particles present in a given solid-gas mixture is borne wholly by the gas. Gas velocities equal to about 60 to 120% and especially about 80–95% of the minimum fluidization velocity are especially favorable for assuring sensitive control of flow rate, since it is in these ranges that the viscosity or intrinsic mobility of the aerated solids undergoes a rapid change with any change in gas velocity. At velocities in excess of the indicated figures, fluidization is so complete and viscosity of the fluidized stream is relatively so low within the control device, that even relatively great changes in the amount of aeration gas admitted have only a negligible effect on the viscosity of the stream and consequently no effective rate control is possible at such a high degree of fluidization. Conversely, when the gas velocity in the control device is allowed to drop substantially below the indicated lower limit, and when the solids are free of fines as specified, the aeration of the solids becomes so incomplete and their resistance to flow becomes so great, that further flow of solids in the unit becomes interrupted or totally blocked, which is usually undesirable except when catalyst flow is purposely to be shut off as in an emergency or at the end of a run.

In addition to the conditions mentioned above it is also important that the control well or flow regulator be properly designed for the intended operation, wider wells usually being preferred for systems handling relatively fine solids characterized by low fluidization velocities than for systems handling relatively coarse solids characterized by high fluidization velocities. Also, for proper control, it is desirable that the depth of the solid bed in the control well be sufficiently deep in proportion to the height of the solids in the standpipe whose flow rate is to be controlled, so as to avoid blowouts or excessively sudden rate changes; and while it is impractical and unnecessary to list here exact figures for the depth of the control wells for all possible contingencies, in general it is desirable that the well depth above the aeration grid equal at least one-twentieth and preferably exceed one-tenth of the height of the standpipe to which the well is attached.

For any solid or given effective particle size and bulk density, the minimum fluidization gas velocity which determines the region of practical operation of the present invention can be readily obtained from the equations for and correlation between friction factor and Reynolds number published in Petroleum Refiner, vol. 23, No. 7 (July 1944), pages 247–252, particular reference being made to the equations for friction factor $$f = \Delta \frac{P \cdot D \cdot g \cdot S}{2 G_0^2 \cdot L}$$

and Reynolds number $$Re = \frac{D \cdot G_0}{n}$$

on page 247 and the correlating graph on page 252 thereof.

In making the calculations, it will be noted that the unknown minimum fluidization mass velocity $G_0$ corresponds to a condition wherein the pressure drop $\Delta P$ in a bed having a depth $L$ equal to 1 foot is just equal to the known bulk density value of the solids, $D$ is the known effective particle diameter, $g$ is the gravity constant of 32.2 ft./sec.$^2$, $S$ is the known average gas density, e. g. 0.0765 lb./cu. ft. for air at room temperature, and $n$ is the absolute viscosity of the gas, e. g., $1.21 \times 10^{-5}$ lbs./ft. sec. for air at room temperature. By substituting the proper values in the aforementioned equations one finds that for any given system $$f = \frac{k_1}{V_0^2}$$

and $Re = k_2 \cdot V_0$, wherein constants $k_1$ and $k_2$ can be calculated and $V_0$, which equals $G_0 \cdot S$, is the unknown minimum fluidization velocity in feet per second. For instance, for solids having a bulk density of 40 lbs./cu. ft. and an effective particle diameter of $3.98 \times 10^{-5}$ ft. and using the other numerical values just indicated, $k_1$ equals 33.4 and $k_2$ equals 25.2. The unknown velocity $V_0$ is then obtained by a trial and error method, inserting assumed $V_0$ values into both equations until the friction factor calculated for a given assumed velocity equals the friction factor read off the graph (on page 252 of the aforesaid publication) for a Reynolds number calculated with the same assumed velocity.

For purposes of illustration, typical minimum fluidization velocities calculated for solids having various effective particle diameters and various bulk densities are shown in Table I below.

*Table I*

| Powdered Solids | | | Gas—Minimum Superficial Fluidization Velocity, ft./sec. |
|---|---|---|---|
| Bulk Density, lb./cu. ft. | Effective Particle Size | | |
| | Microns | Feet | |
| 40 | 74 | 0.00035 | 0.015 |
| | 149 | 0.00070 | 0.057 |
| | 297 | 0.00140 | 0.22 |
| | 840 | 0.00398 | 1.2 |
| 80 | 74 | 0.00035 | 0.029 |
| | 149 | 0.00070 | 0.11 |
| | 297 | 0.00140 | 0.43 |
| | 840 | 0.00398 | 2.0 |
| 160 | 74 | 0.00035 | 0.056 |
| | 149 | 0.00070 | 0.22 |
| | 297 | 0.00140 | 0.85 |
| | 840 | 0.00398 | 3.2 |

When the above data are plotted on logarithmic paper, it can be seen that for particles having an effective particle diameter below about 500 microns a relatively simple equation can be established between effective particle size and minimum fluidization velocity. For instance, for particles having a bulk density of 40 lbs./cu. ft., which is typical of many powdered cracking catalysts, the minimum fluidization velocity $V_0$ (in ft./sec.) corresponding to any particular effective particle size D (in microns) can be calculated from the equation $$\log V_0 = 1.907 \log D - 5.3891$$

Similar equations can be derived for particles having other bulk densities, it being noted from Table I that for all practical purposes the minimum fluidization velocity of a given powdered solid having an effective particle size not larger than about 300 to 500 microns can be said to be directly proportional to the bulk density of the solid. Thus, as an approximation, the minimum fluidization velocity $V_0$ for powdered solids having a bulk density S (lbs./cu. ft.) and an effective particle diameter D (microns), can be calculated from the equation $$\log V_0 = 1.907 \log D + \log S - 6.991.$$

After the minimum fluidization velocity of a given kind of solids has been determined, either experimentally or mathematically as described above, the rate of flow of the solids can be sensitively controlled in a system such as a fluid cracker by holding the superficial velocity of an aeration gas in the flow control well close to the determined value and by varying the gas rate in the desired manner. The surprising fact is that, having determined the minimum fluidization velocity, a wide range of sensitive control over the rate of solids flow becomes possible by a careful adjusting of the gas velocity over a relatively narrow range which may extend from about 60% to about 120% of the minimum fluidization velocity, in which range relatively small variations in gas velocity have a very great effect on the viscosity of the suspension of solids in the gas. It is because of this rather rapid change in viscosity in this range that although the transition region between the non-fluid and fluidized state is extremely narrow in terms of aeration gas velocity, nevertheless a method and an apparatus have now been devised for obtaining sensitive variations in solids flow solely by varying the rate of an aeration gas within the control device.

Having described various specific embodiments of the invention, it is to be understood that these are by way of illustration only and that various changes and modifications may be made without departing from the spirit of the present invention or from the scope of the appended claims.

We claim:

1. In a device for conducting gas phase reactions in the presence of a fluidized finely divided solid which is circulated between two dense fluidized beds maintained, respectively, in a reactor vessel and a regenerator vessel, the improvement which comprises a vertical elongated standpipe communicating with the bottom portion of one of said vessels; a high-resistance perforated grid disposed across the lower portion of the standpipe; a valved gas inlet communicating with the standpipe below said grid; a conduit disposed transversely through said standpipe at a level intermediate between the vessel and the grid and communicating with the other of the two vessels, said conduit being provided with a valved gas or vapor inlet in the vicinity of the standpipe; and a tube concentrically disposed within the standpipe, said concentric tube extending from a level some distance above the aforesaid grid to an opening in the bottom wall of the transverse conduit, through which opening said conduit communicates with the concentric tube.

2. A device according to claim 1 wherein the length of the standpipe below the transverse conduit equals at least one-tenth of the total height of the standpipe.

3. In a process for catalytically cracking hydrocarbons wherein finely divided solid catalyst particles characterized by a diameter essentially between 20 and 500 microns, an average particle diameter of at least 50 microns, and a bulk density between about 30 to 100 lbs./cu. ft. are continuously circulated between two dense fluidized beds maintained, respectively, in a reaction zone and a regeneration zone, the improvement which comprises withdrawing a confined elongated column of catalyst downwardly from one of the dense beds at a linear velocity not exceeding 0.5 ft./sec., injecting a small amount of an aeration gas into the catalyst column to keep the withdrawn catalyst mobile, subsequently forcing the withdrawn confined catalyst downwardly through an annular zone and immediately thereafter through a cylindrical zone located concentrically within the annular zone, said annular and cylindrical zones having communicating bottom portions, injecting an aeration gas upwardly into the bottom of the annular and cylindrical zones and evenly distributing the aeration gas across the entire cross-section of the last mentioned zones, the gas injection rate being regulated to give a superficial gas velocity V within the two last mentioned zones which velocity V is within the range between about 80 to 95% of the minimum fluidization velocity $V_0$ determined from the equation $\log V_0 = 1.907 \log D + \log S - 6.991$ wherein $V_0$ is the minimum fluidization velocity in feet/second, D is the effective particle diameter of the catalyst in microns and S is the bulk density of the catalyst in pounds/cu. ft., whereby the intrinsic mobility and flow rate of the aerated catalyst is adjusted to a predetermined value, passing a confined stream of gasiform fluid transversely across the top of the aforesaid cylindrical zone at a rate between about 20 and 100 ft./sec. whereby a disperse suspension of catalyst in gasiform fluid is formed, and conducting the resulting suspension to the other one of said dense fluidized beds maintained in the system.

4. In an apparatus for conducting gas phase reactions in the presence of a fluidized, finely divided solid maintained in a dense phase suspension, the improvement which comprises a substantially vertical, elongated standpipe having a lower end, a shorter pipe, having an upper end and a lower end, disposed in radially spaced, concentric relation to said standpipe at said lower end thereof, said standpipe and said shorter pipe defining an annulus between them, the outer one of said concentric pipes which define said annulus extending below the lower end of the inner one thereof, a bottom closure for the lower end of the outer one of said pipes, a perforated grid characterized by a high resistance to gas flow disposed across the lower end of said outer pipe, a valved gas inlet opening through the bottom closure of said outer one of said pipes below said grid, and a transverse conduit disposed at an angle to said standpipe at the upper end of said annulus, said transverse conduit communicating with said shorter pipe of the two annulus forming pipes.

5. An apparatus according to claim 4, wherein said shorter pipe is disposed exteriorly of said standpipe.

References Cited in the file of this patent

UNITED STATES PATENTS

| | | |
|---|---|---|
| 2,399,050 | Martin | Apr. 23, 1946 |
| 2,541,662 | Palmer | Feb. 13, 1951 |
| 2,584,378 | Beam | Feb. 5, 1952 |